(12) United States Patent
Matsukawa et al.

(10) Patent No.: US 7,367,828 B2
(45) Date of Patent: May 6, 2008

(54) MEMORY CARD CONNECTOR WITH EJECTOR MECHANISM

(75) Inventors: Jun Matsukawa, Yamato (JP); Mitsuhiro Tomita, Yamato (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/553,824

(22) PCT Filed: Mar. 19, 2004

(86) PCT No.: PCT/US2004/008528

§ 371 (c)(1),
(2), (4) Date: Oct. 16, 2006

(87) PCT Pub. No.: WO2004/095650

PCT Pub. Date: Nov. 4, 2004

(65) Prior Publication Data

US 2007/0037424 A1  Feb. 15, 2007

(30) Foreign Application Priority Data

Apr. 23, 2003 (JP) .............................. 2003-118091

(51) Int. Cl.
*H01R 13/62* (2006.01)
(52) U.S. Cl. ....................................... 439/160
(58) Field of Classification Search ................ 439/159, 439/160
See application file for complete search history.

(56) References Cited

U.S. PATENT DOCUMENTS

| | | | |
|---|---|---|---|
| 6,290,136 B1 | 9/2001 | Koseki et al. | |
| 6,520,784 B2 | 2/2003 | Ito et al. | |
| 6,843,670 B2 | 1/2005 | Yamaguchi et al. | |
| 6,994,573 B2 * | 2/2006 | Tanaka et al. | ............... 439/159 |
| 2002/0142640 A1 | 10/2002 | Abe | |
| 2002/0146923 A1 | 10/2002 | Yu | |

FOREIGN PATENT DOCUMENTS

| | | |
|---|---|---|
| JP | 10-144422 | 5/1998 |
| JP | 2001-085089 | 3/2001 |
| JP | 2001-257029 | 9/2001 |
| JP | 2001-291552 | 10/2001 |
| JP | 2002-083651 | 3/2002 |
| JP | 2002-237351 | 8/2002 |

* cited by examiner

*Primary Examiner*—Ross Gushi
(74) *Attorney, Agent, or Firm*—Charles S. Cohen

(57) ABSTRACT

A memory card connector includes an insulative housing having a rear terminal-mounting section which mounts a plurality of terminals having contact portions for engaging appropriate contacts on a memory card. A metal shell is mounted on the housing and combines therewith to define an interior card-receiving cavity formed by a top plate and opposite side plates of the metal shell. The cavity has a front insertion opening to permit insertion and withdrawal of the memory card into and out of the connector. The terminal-mounting section of the housing is located at the rear of the cavity. A card ejector mechanism is located at least partially beneath the cavity adjacent one side thereof, whereby the opposite side plates of the metal shell define the opposite sides of the cavity.

15 Claims, 11 Drawing Sheets

MEMORY CARD CONNECTOR WITH EJECTOR MECHANISM

FIELD OF THE INVENTION

This invention generally relates to the art of electrical connectors and, particularly, to a memory card connector.

BACKGROUND OF THE INVENTION

Memory cards are known in the art and contain intelligence in the form of a memory circuit or other electronic program. Some form of card reader reads the information or memory stored on the card. Such cards are used in many applications in today's electronic society, including video cameras, digital still cameras, smartphones, PDA's, music players, ATMs, cable television decoders, toys, games, PC adapters, multi-media cards and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card.

The memory card, itself, writes or reads via the connector and can transmit between electrical appliances, such as a word processor, personal computer, personal data assistant or the like. The card may be used in applications such as mobile or cellular telephones which are actuated and permit data access after identifying an identification code stored on a SIM (subscriber identification module) card. The SIM card has a conductive face with an array of contacts, and the mobile phone has a SIM card connector with terminals for electrical connection with the contacts of the SIM card to ensure the subscriber identification confirmation.

A typical memory card connector includes some form of dielectric housing which is covered by a metal shell. The metal shell may be stamped and formed of sheet metal material and formed substantially into a box-shape. The metal shell and the housing combine to define a card-receiving cavity. One end of the cavity is open to form a card-insertion opening. The dielectric housing may be generally L-shaped or U-shaped and includes a rear terminal-mounting section at the rear of the cavity, and at least one longitudinal side wall section extends forwardly from one or both ends of the rear section at one or both sides of the cavity. The metal shell has a top plate substantially covering the dielectric housing, with side plates extending downwardly over the side wall sections of the housing. One or both of the side wall sections of the housing define the sides of the card-receiving cavity.

Some card connectors include a card ejector mechanism whereby the memory card is simply inserted into the connector, and the ejector mechanism is used to facilitate removal of the card from the connector. Some ejector mechanisms include slider members which engage the memory card for movement therewith into and out of the connector. Latches, cams, eject devices and other operative components then are operatively associated with the slider rather than the memory card itself. It is known to provide the ejector mechanism with a latch or lock member which may be on the slider, itself, and which is engageable with a latch or lock portion of the memory card, such as a cut-out or notch in a side edge of the card. One type of card ejector mechanism includes a heart-shaped cam slot in the slider, with a pin member operatively biased into the heart-shaped cam slot, and with a spring member to normally bias the slider in a direction of withdrawal of the memory card. This type of card ejector mechanism is called a "push/push type" ejector in that the memory card first is pushed into the cavity of the connector to a latched operative position, and a second push on the card is effective to release the card and allow the spring to eject the card from its latched position.

One or more of the above design features of conventional memory card connectors and/or ejector mechanisms are shown in Japanese Patents Laid-Open 2001-85089; 2001-257029; 2001-291552; 2002-83651; 2002-237351 and 10-144422.

Unfortunately, almost all ejector mechanisms, including the slider-type mechanisms described above, are mounted on one of the side wall sections of the connector housing which define the sides of the card-receiving cavity, and this tends to increase the overall size of the card connector envelope, when miniaturization and size-reduction have become most desirable in memory card connectors. In other words, the ejector mechanisms function generally in the plane of the memory card in the connector, outside the overall envelope of the memory card, itself, and this increases the card connector size. In fact, the side wall sections of the housing contribute to the overall size of the connector without the ejector mechanism added thereto. As an example, when such memory card connectors are mounted on a printed circuit board, the space or "real estate" on the printed circuit board is at a premium, and any efforts to reduce the overall size of the connector results in an increase in the useful space on the surface of the circuit board. The present invention is directed to solving these problems by having the metal shell define the opposite sides of the card-receiving cavity of the connector, with a card ejector mechanism mounted on a side wall section of the housing at a level beneath the memory card, i.e., the ejector mechanism operates within the envelope of the memory card, itself, and does not significantly increase the size of the card connector. The present invention is effective to significantly reduce the size of card connectors of the prior art as described or enumerated above.

SUMMARY OF THE INVENTION

An object, therefore, of the invention is to provide a new and improved memory card connector of the character described, with a reduced size in a direction generally parallel to the memory card.

Another object of the invention is provide a new and improved memory card connector of the character described and which includes a card ejector mechanism.

In the exemplary embodiment of the invention, the memory card connector includes an insulative housing having a rear terminal-mounting section which mounts a plurality of terminals having contact portions for engaging appropriate contacts on a memory card. A metal shell is mounted on the housing and combines therewith to define an interior card-receiving cavity formed by a top plate and opposite side plates of the metal shell. The cavity has a front insertion opening to permit insertion and withdrawal of the memory card into and out of the connector. The terminal-mounting section of the housing is located at the rear of the cavity. A card ejector mechanism is located beneath the cavity adjacent one side thereof whereby the opposite side plates of the metal shell define the opposite sides of the cavity.

According to one embodiment of the invention, the card ejector mechanism includes a card-engaging slider movable with the card and having a cam slot in an outside face thereof. One of the side plates of the metal shell includes a spring member for biasing a cam follower pin into the cam slot. As disclosed herein, the metal shell is stamped and formed of sheet metal material, and the spring member comprises a spring arm stamped out of the one side plate of the metal shell.

According to another embodiment of the invention, the card ejector mechanism includes a slider having a cam slot in a bottom face thereof. One of the side plates of the metal shell has a bottom inwardly turned flange with a spring member for biasing the cam follower pin into the cam slot.

According to one aspect of the invention, the slider has a locking arm that swings up and down into and out of engagement with a locking recess in the overlying memory card. The metal shell includes a spring member for engaging a portion of the slider and to bias the locking arm into engagement with the recess in the overlying memory card. The spring member may comprise a spring arm stamped and formed out of the top plate of the metal shell. Preferably, the housing includes a cut-out area beneath the locking arm to accommodate downward swinging movement of the arm.

According to another aspect of the invention, the slider again includes a locking arm that swings into and out of engagement with the locking recess in the overlying memory card. However, in order to accommodate the swinging movement of the locking arm, the arm is cantilevered and is recessed along a distal end thereof.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the FIGS. and in which:

DETAILED DESCRIPTION OF THE PREFERRED EMBODIMENTS

Figure 1:
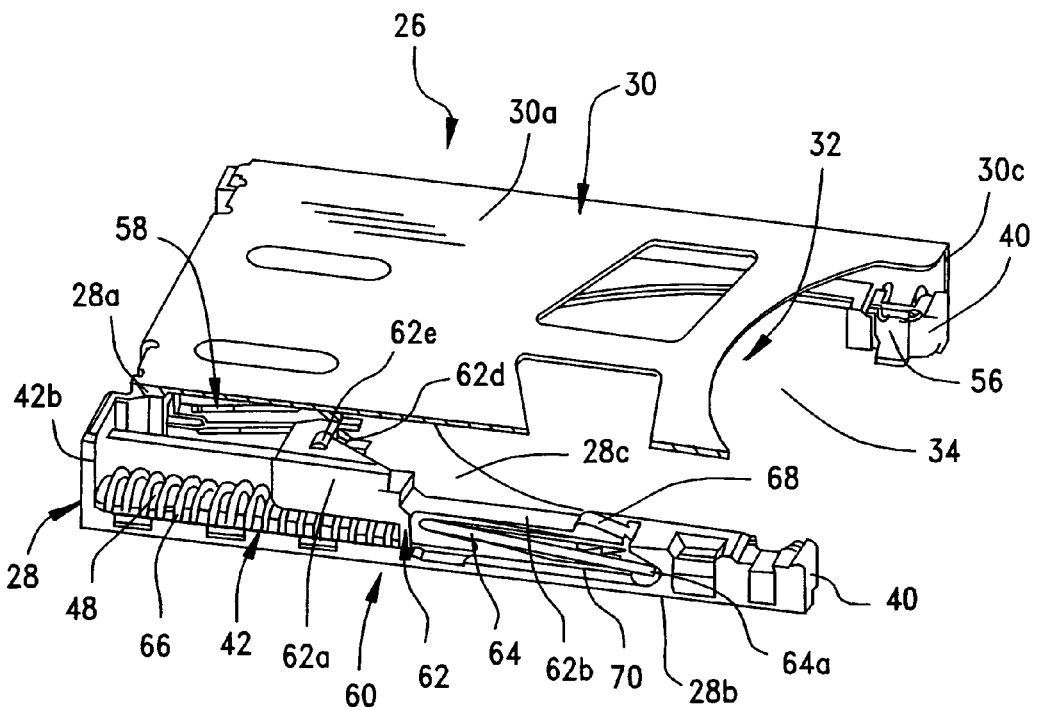
FIG. 1 is a perspective view of a memory card connector according to a first embodiment of the invention, with the metal shell cut-away to show the components of the ejector mechanism.

Referring to the drawings in greater detail, and first to FIGS. 1, 2 and 5-10, a first embodiment of the invention is incorporated in a memory card connector, generally designated 26, which includes a dielectric housing, generally designated 28, and a sheet metal shell, generally designated 30. The housing and shell combine to define an interior card-receiving cavity, generally designated 32, which has a front insertion opening 34 to permit insertion and withdrawal of a memory card, generally designated 36 (FIG. 5), into and out of the connector. The housing may be a one-piece structure unitarily molded of dielectric plastic material or the like. The metal shell also may be a one-piece structure stamped and formed of sheet metal material.

Before proceeding with detailed descriptions of the various connector components, it may be helpful to understand that the housing and the metal shell define two levels within the envelope of the connector. Card-receiving cavity 32 basically defines an upper level into which the memory card is inserted. Other components of the connector, such as a card ejector mechanism described hereinafter, have substantial portions located in a lower level beneath the memory card. As a general proposition, this allows the overall size of connector 26 to be reduced in a direction generally parallel to the memory card, itself.

Figure 3:
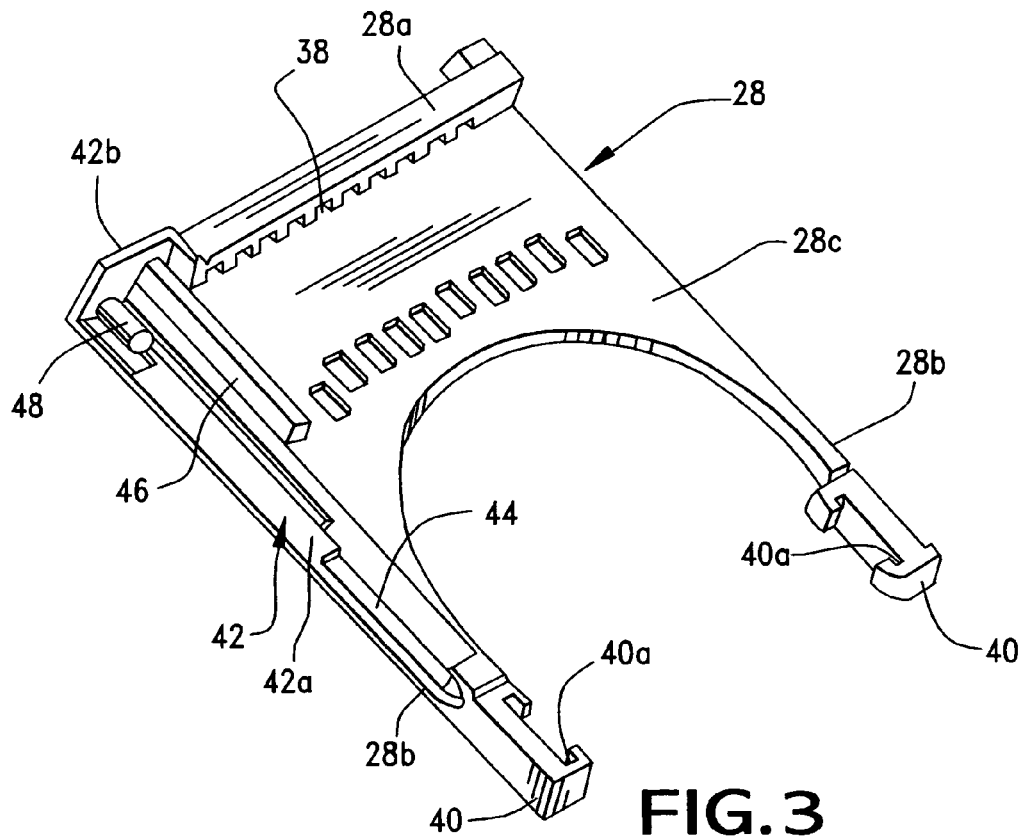
FIG. 3 is a top perspective view of the connector housing.
Figure 4:
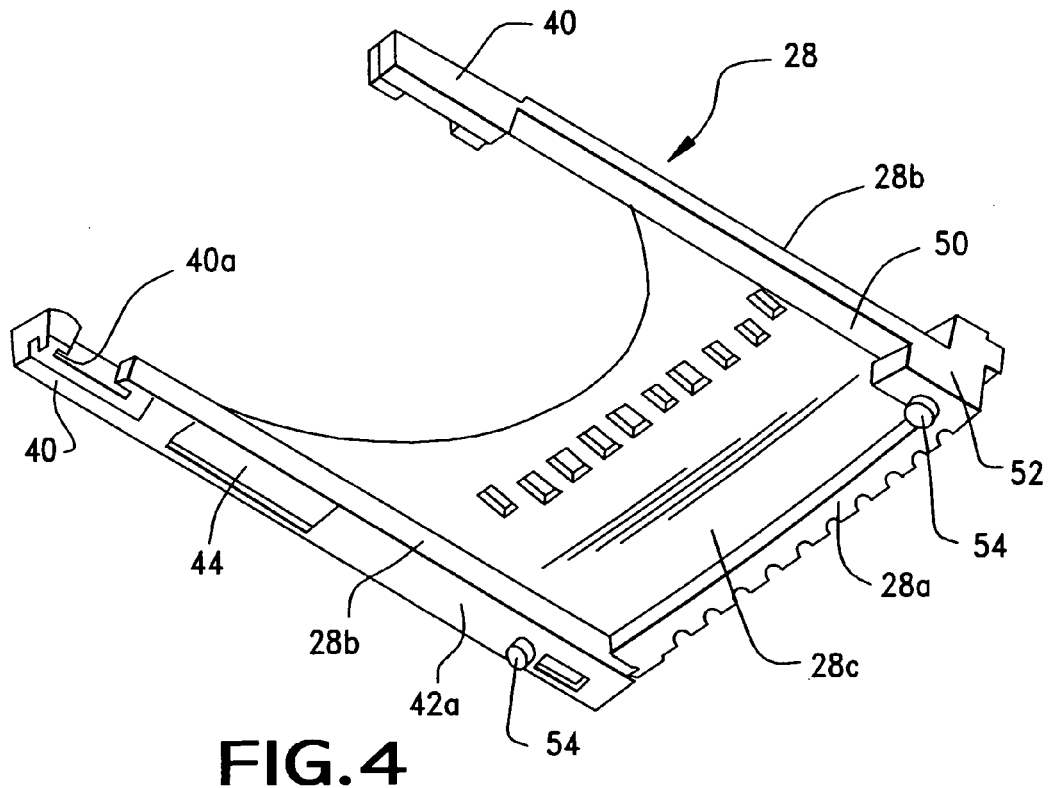
FIG. 4 is a bottom perspective view of the connector housing.

With that understanding, reference now is made to FIGS. 3 and 4 where it can be seen that dielectric housing 28 is generally U-shaped, as defined by a rear terminal-mounting section 28a along with a pair of elongated, side wall sections 28b. A plate section 28c spans side wall sections 28b in front of rear terminal-mounting section 28a. The rear terminal-mounting section has a plurality of through passages 38 for mounting a plurality of terminals, as will be seen hereinafter. A metal reinforcement block 40, having a mounting slot 40a, is provided at the outer or distal end of each side wall section 28b. As seen in FIG. 4, the left-hand side wall section 28b combines with plate section 28c to form a generally L-shaped recess, generally designated 42 for accommodating a card ejector mechanism, as will be seen hereinafter. The recess is defined, at least in part, by a bottom wall 42a and a rear wall 42b of the unitarily molded housing. An elongated opening 44 is formed in the bottom wall, a wrongly inserted card stop flange 46 projects forwardly of rear wall 42b and a spring mounting post 48a also projects forwardly of the rear wall, all for purposes described hereinafter. As seen in FIG. 4, the bottom of one of the opposite side wall sections 28b is recessed, as at 50, and a standoff 52 projects downwardly from the adjacent corner of the housing. The bottom of the standoff is generally flush with the bottom of bottom wall 42a of the opposite side wall section, and a pair of mounting posts 54 project downwardly from those surfaces for insertion into appropriate holes in a printed circuit board to mount the housing to the board.

As best seen in FIG. 1, a metal reinforcement member 56 is press-fit into the mounting slot 40a (FIG. 3) of each metal reinforcement block 40 of the housing. As seen best in FIG. 6, each metal reinforcement member 56 has a generally flat foot portion 56a for securing the housing (and connector) to appropriate mounting pads on the printed circuit board.

Figure 11:
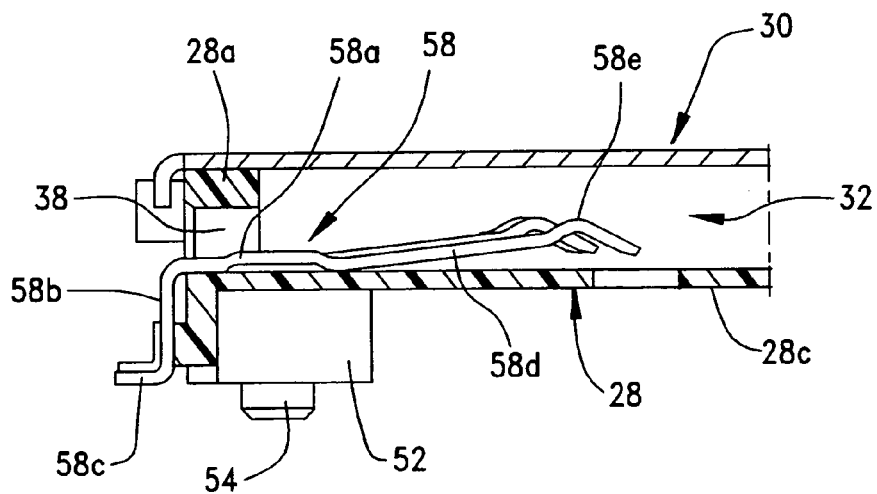
FIG. 11 is an enlarged vertical section taken generally along line A-A in FIG. 5.

FIG. 11 shows how a plurality of conductive terminals, generally designated 58, are mounted in through passages 38 in rear terminal-mounting section 28a of the housing. Each terminal includes a mounting portion 58a which is press-fit into a respective one of the through passages 38. A tail portion 58b projects outwardly of the rear of the connector and terminates in a foot portion 58c which is connected, as by soldering, to an appropriate circuit trace on the printed circuit board. A contact arm of each terminal is cantilevered forwardly and upwardly into card-receiving cavity 38 and terminates in a concave contact portion 58e for engaging appropriate contacts on a bottom surface of memory card 36 when fully inserted into the cavity. FIG. 11 also shows how card-receiving cavity 36 is elevated above the bottom surface of standoff 52 which rests on the top surface of the printed circuit board, leaving considerable space beneath plate section 28c of the housing. In other words, it can be seen clearly in FIG. 11 how plate section 28c forms a bottom of cavity 32 at the rear of the connector in front of terminal-mounting section 28a of the housing.

Referring back to FIG. 1, a card ejector mechanism, generally designated 60, is located within the L-shaped recess 42 (FIG. 3) defined by the housing. Substantial portions of the ejector mechanism are located at a lower level (described above in relation to FIG. 11) beneath cavity 32 and beneath a memory card inserted into the cavity.

Specifically, card ejector mechanism 60 includes a cam slider member, generally designated 62, a pin member 64 and a coil spring 66 all located within the L-shaped recess 42. The coil spring is mounted about spring mounting post 48 (FIG. 3) and is sandwiched between cam slider 62 and rear wall 42b of the recess.

Figure 14:
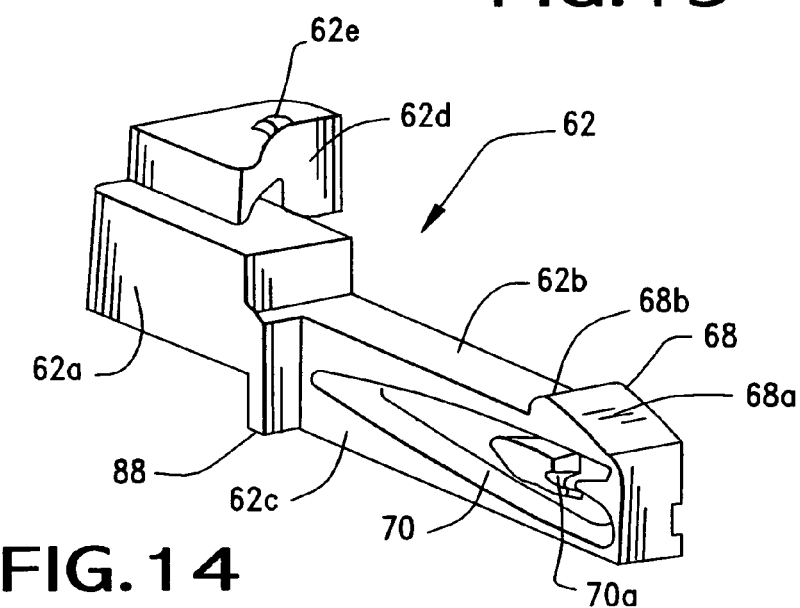
FIG. 14 is an enlarged perspective view of the cam slider of the ejector mechanism of the first embodiment.

Referring to FIG. 14 in conjunction with FIG. 1, cam slider 62 may be unitarily molded of dielectric plastic material and includes a rear, upwardly projecting body block 62a and a forwardly projecting locking arm 62b. The top surface of locking arm 62b is generally coplanar with the upper surface of plate section 28c of the housing. The distal end of the locking arm includes a locking projection 68 which has a gentle sloping surface 68a at the lead side of the projection, and an abrupt catch surface 68b at the rear of the projection. A heart-shaped cam slot 70 is molded into an outside face 62c of locking arm 62b. The heart-shaped cam slot is of a conventional "push/push" configuration. The slider has a card-engaging surface 62d and an upwardly projecting boss 62e for purposes described hereinafter.

Referring to FIG. 1, one end 64a of pin member 64 is fixed to side wall section 28b of the housing. An opposite end 64b of the pin member is captured in the heart-shaped cam slot 70. Therefore, end 64b can follow the contour of the cam slot. Coil spring 66 constantly urges slider 62 in a forward direction toward front insertion opening 34 of card-receiving cavity 32. With the upper surface of locking arm 62b being generally coplanar with the upper surface of plate section 28c which forms a portion of the bottom of cavity 32, locking projection 68 projects upwardly into the cavity for engagement with a recess at a side edge of memory card 36. When the memory card is inserted into cavity 32, a forward curved end of the memory card pushes down on gentle sloped surface 68a of locking projection 68, thereby causing cam slider 62 to swing downwardly in a pivoting action which, in turn, causes locking projection 68 to move downwardly from the card-insertion cavity. When the card is pushed in sufficiently to engage card-engaging surface 62d of the cam slider, locking projection 68 is in alignment with the locking recess of the memory card.

Metal shell 30 is generally rectangular and large enough to cover dielectric housing 28. The metal shell includes a top plate 30a and opposite side plates 30b and 30c which depend downwardly from opposite edges of the top plate. When the metal shell is assembled to housing 28, the metal shell and housing define card-insertion cavity 32. In essence, the top of the cavity is defined by top plate 30a of the metal shell. The opposite sides of the cavity are defined by opposite side plates 30b and 30c of the metal shell. The bottom of the cavity is defined by plate section 28c of housing 28. Therefore, the side wall sections of the housing do not form opposite sides of the cavity because the side wall sections are located at a level below the cavity. Rear terminal-mounting section 28a of the housing forms the rear of the cavity.

Figure 2:
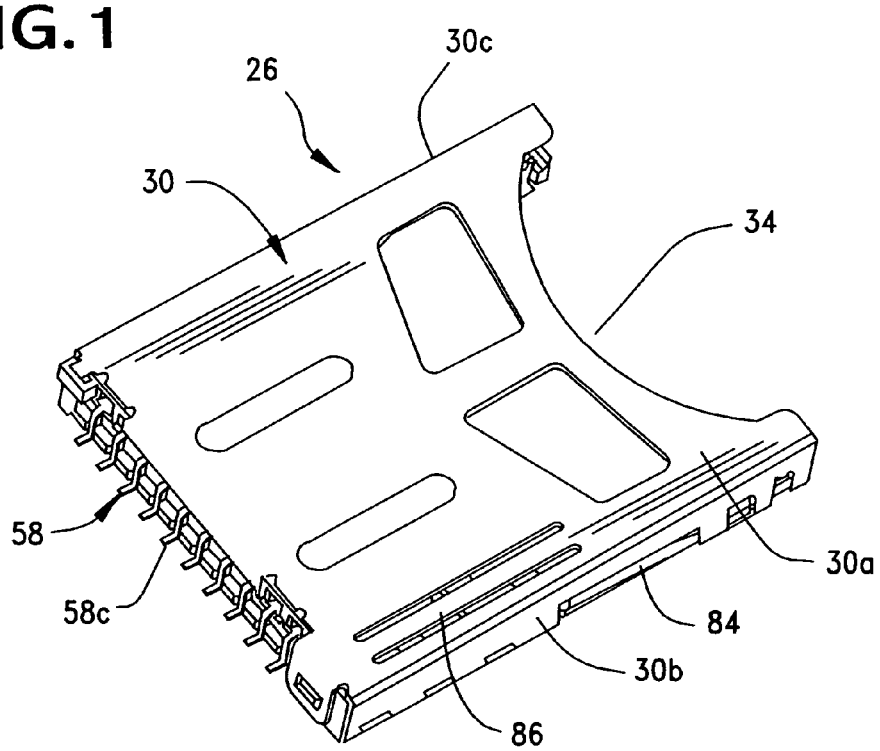
FIG. 2 is a rear perspective view of the connector.
Figure 7:
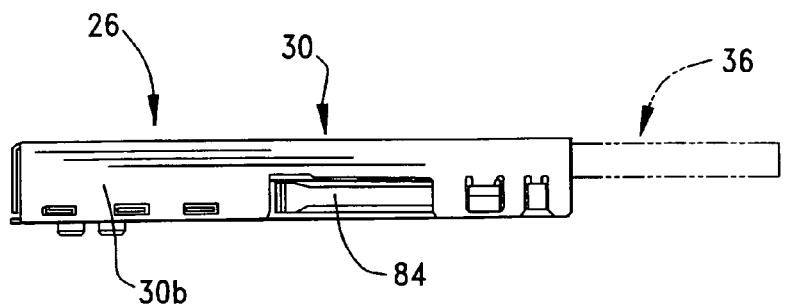
FIG. 7 is a side elevational view of the connector, looking at the left-hand side as viewed toward the insertion opening of the connector.
Figure 8:
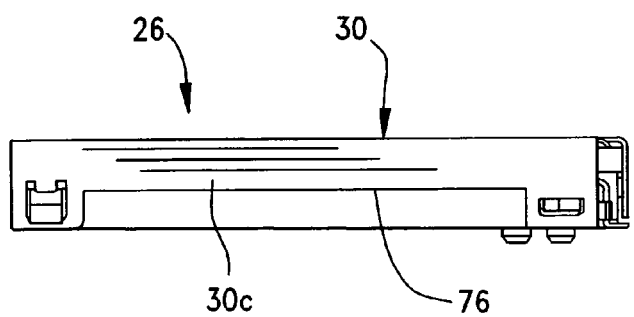
FIG. 8 is a right-hand side elevational view of the connector.

One of the opposite side plates 30b of metal shell 30 has substantially the same height throughout its longitudinal length in a front-to-rear direction of the connector. Side wall section 30b covers the front metal reinforcement block 40 of the housing and forms an outside wall of the L-shaped recess 42 which houses card ejector mechanism 60, as can be seen in FIGS. 2 and 7. As seen in FIG. 8, the other side plate 30c covers the front metal reinforcement block, but side plate 30c is cut-out, as at 76, leaving the top of the side plate to define that side of card-receiving cavity 32.

Figures 12, 13:
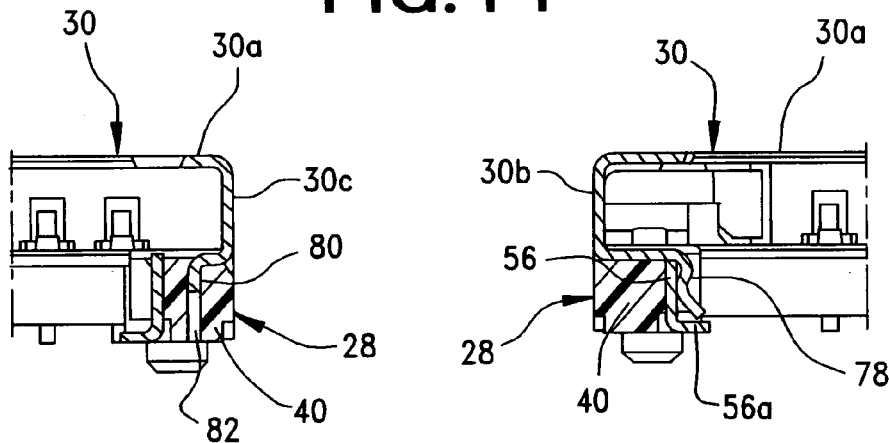
FIG. 12 is an enlarged vertical section taken generally along line B-B in FIG. 5.
FIG. 13 is an enlarged vertical section taken generally along line C-C in FIG. 5.

As seen in FIGS. 12 and 13, opposite side plates 30b and 30c of metal shell 30 have engagement flanges 78 and 80, respectively, for fastening the metal shell to dielectric housing 28. As seen in FIG. 13, engagement flange 78 of side plate 30b is engaged with metal reinforcement member 56, thereby making it possible to ground the metal shell to a ground circuit trace on the printed circuit board via the metal reinforcement member. As seen in FIG. 12, engagement flange 80 of side plate 30c is press-fit into a groove 82 formed in metal reinforcement block 40 of the housing.

Figure 5:
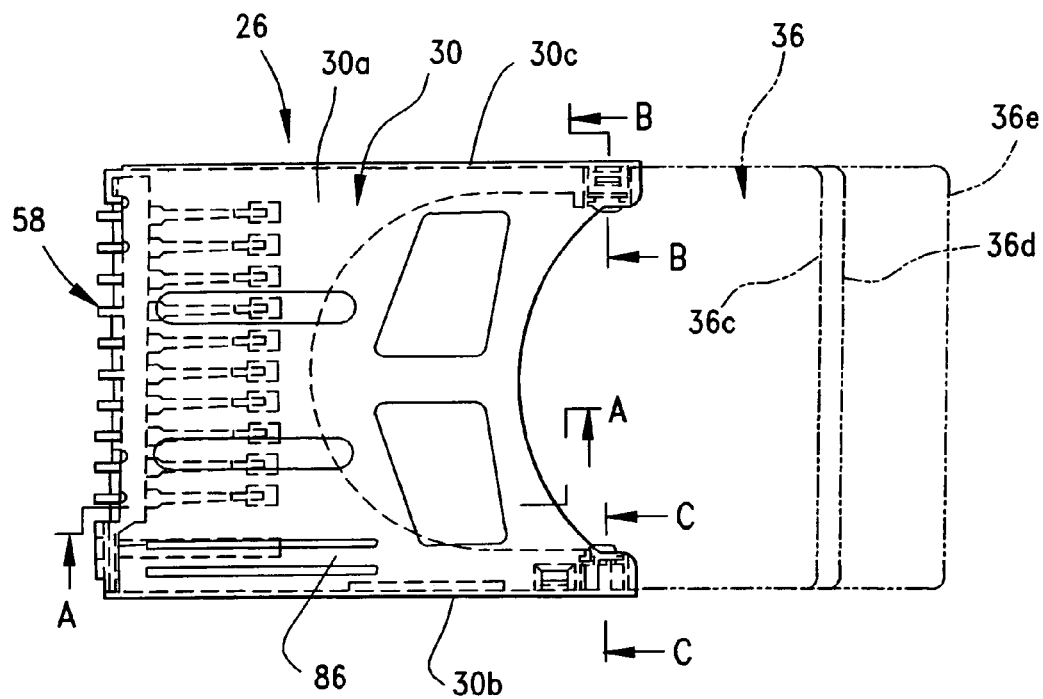
FIG. 5 is a top plan view of the connector, with a memory shown in phantom in various positions.
Figure 6:
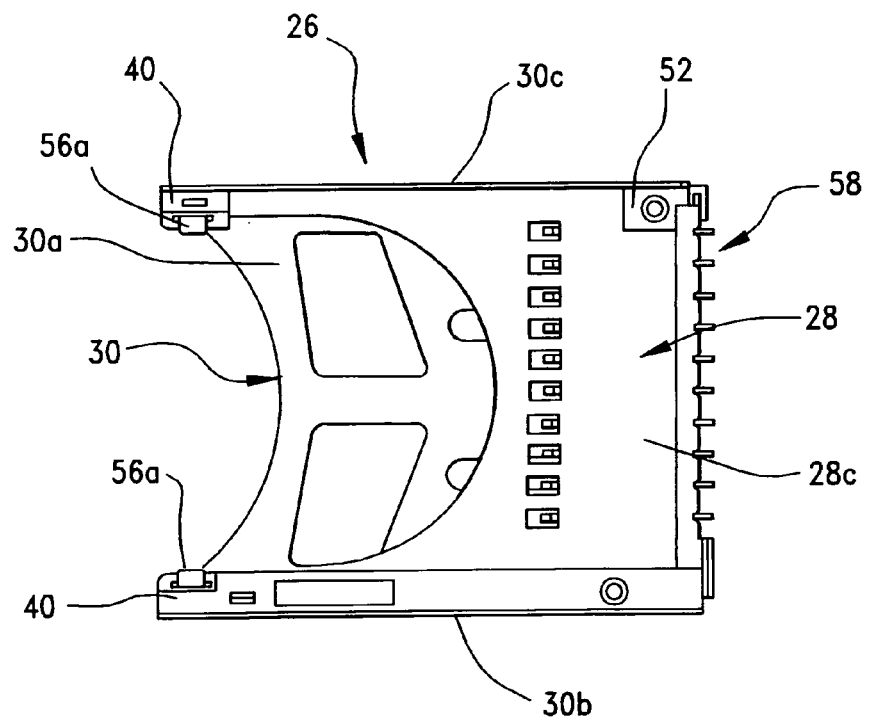
FIG. 6 is a bottom plan view of the connector.

With metal shell 30 stamped and formed of sheet metal material, the metal shell is stamped and formed with various springs to facilitate the operation of card ejector mechanism 60. First, as seen in FIGS. 2 and 7, a cantilevered spring arm 84 is stamped and formed out of side plate 30b of the metal shell. Spring arm 84 biases pin member 64 of the ejector mechanism into the heart-shaped cam slot 70 in outside face 62c (FIG. 14) of the cam slider. As seen in FIGS. 2 and 5, a second suspension-like spring arm 86 is stamped and formed out of top plate 30a of metal shell 30. Spring arm 86 engages the upwardly projecting boss 62e (FIGS. 1 and 14) of the cam slider to bias the cam slider in a swinging or pivoting motion to bias locking projection 68 upwardly about a pivot point generally in the area indicated at 88 in FIG. 14. When a memory card is inserted into cavity 32 and engages locking projection 68 of the cam slider to pivot locking arm 62b of the slider downwardly, the upwardly projecting boss 62e at the rear of the slider engages the underside of spring arm 86 to load the spring arm, whereupon the spring arm is effective to snap locking projection 68 into the locking recess of the memory card as the card is pushed further into the cavity. This effectively locks the card to the slider for movement therewith.

With card-receiving cavity 32 being formed at its sides by side plates 30b and 30c of metal shell 30, the total width of cavity 32 is equal to the width of memory card 36 plus twice the thickness of side plates 30b and 30c of the metal shell. With the metal shell being of sheet metal material, the total width of the cavity is barely wider than the width of the memory card. This significantly reduces the overall width of connector 26.

Figure 9:
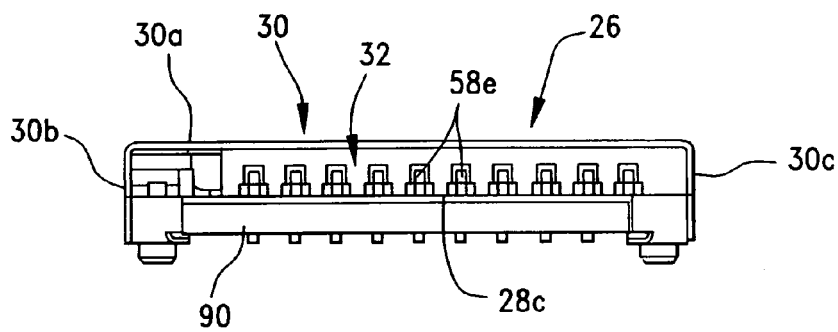
FIG. 9 is a front elevational view of the connector.
Figure 10:
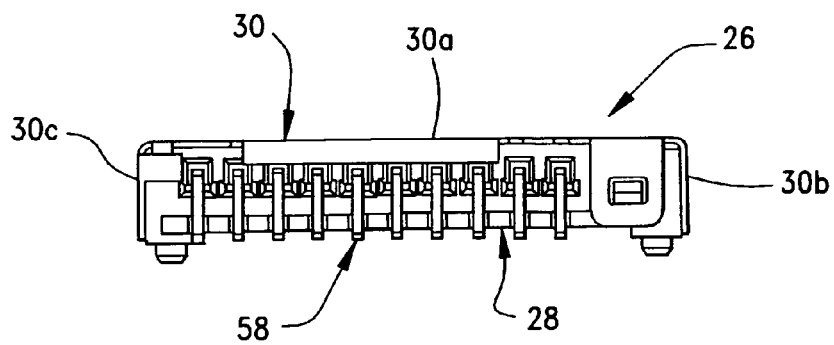
FIG. 10 is a rear elevational view of the connector.

FIG. 9 shows an ancillary advantage of the structural arrangement of the invention. Specifically, it can be seen that while plate section 28c of the housing forms the bottom of card-receiving cavity 32, the plate section is elevated above the top surface of the printed circuit board on which the housing is mounted. This leaves a space 90 beneath plate section 28 within which small-sized electronic parts can be mounted on the circuit board. With side plate 30c of the metal shell being cut-out as seen in FIG. 8, and with the one side wall section 28b of the housing being recessed as at 50 (FIG. 4), the small-sized electronic parts can be inserted into space 90 either from the front of the connector or from one side thereof.

Figure 15:
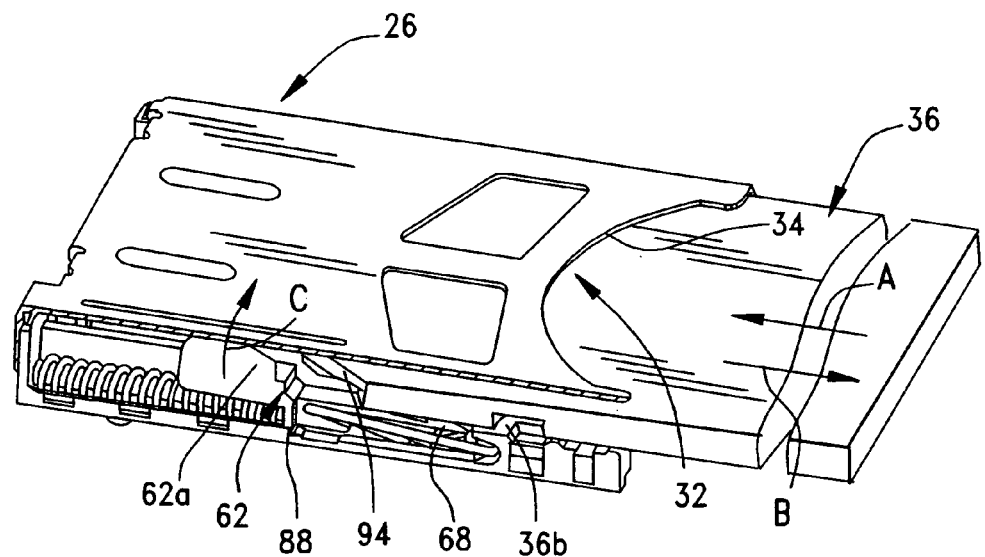
FIG. 15 is a view similar to that of FIG. 1, showing a memory card in an initial position of insertion into the connector.

FIGS. 15-18 show sequential views of inserting memory card connector 36 into card-receiving cavity 32 through front insertion opening 34. The memory card is inserted into the cavity in the direction of arrow "A" (FIG. 15). The card is ejected in the direction of arrow "B". FIG. 15 shows memory card 36 inserted to a point where the card rides along gentle sloped surface 68a (FIG. 14) of locking projection 68 to bias the locking projection and locking arm 62b downwardly. As this occurs, body block 62a of cam slider 62 is biased upwardly in the direction of arrow "C". This causes the upwardly projecting boss 62e (FIG. 14) to push upwardly on spring arm 86 to spring-load the arm. Opening 44 in the side wall section of the housing accommodates this downward movement of locking arm 62b.

Figure 16:
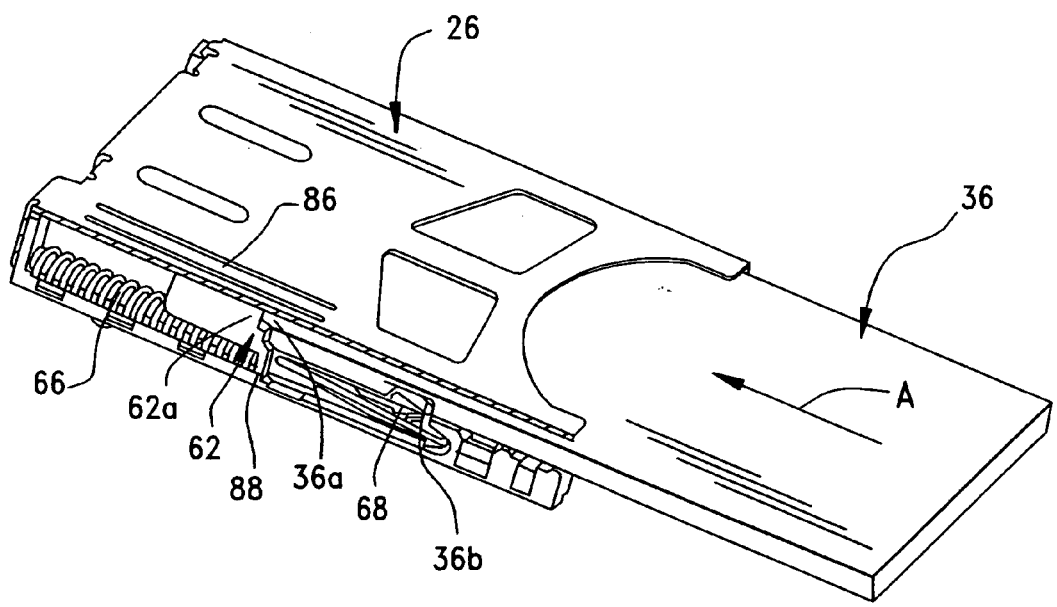
FIG. 16 is a view similar to that of FIG. 15, with the memory card inserted to a position locked with the slider of the card ejector mechanism.

FIG. 16 shows memory card 36 inserted further in the direction of arrow "A" until a front curved corner 36a of the memory card engages card-engaging surface 62b (FIG. 14) of cam slider 62. At this point, locking projection 68 snaps into a locking recess 36b at the edge of the memory card under the biasing affect of spring arm 82 of the metal shell. The card now is locked to the slider for movement therewith.

Figure 17:
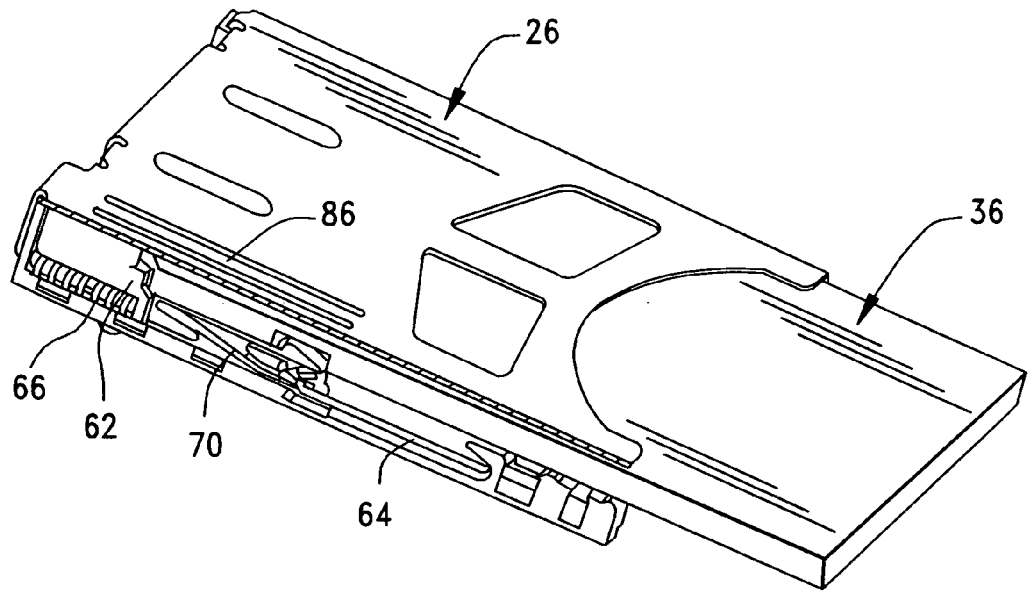
FIG. 17 is a view similar to that of FIG. 16, with the card pushed further to its innermost limit of travel.

FIG. 17 shows memory card 36 and cam slider 62 pushed all the way inwardly to their "overrun" or inner limit position where the contacts on the underside of the memory card have engaged contact portions 58e (FIG. 11) of terminals 58. This compresses coil spring 66.

Figure 18:
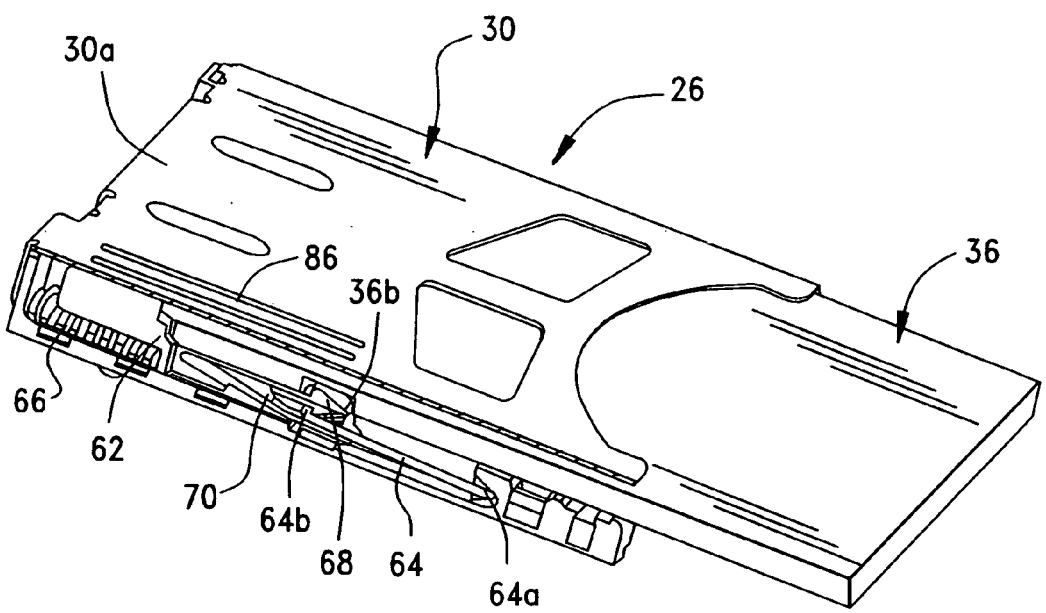
FIG. 18 is a view similar to that of FIG. 17, with the card biased slightly outward to its latched, operative and contact engaging position.

Upon release of memory card 36, and referring to FIG. 18, coil spring 66 is effective to push slider 62 and memory card 36 back outwardly until end 64b of pin member 64 latches into a latch notch 70a (FIG. 14) of the heart-shaped cam slot 70. Contact portions 58e of terminals 58 still are in engagement with the contacts on the underside of the memory card.

As is known in the art of such "push/push" ejector mechanisms, a further push and release of the memory card allows coil spring 66 to push the memory card back to the position of FIG. 16, whereupon the memory card can be pulled outwardly with locking recess 36b riding over catch surface 68b (FIG. 14) of locking projection 68. Throughout the entire action of card ejector mechanism 60, spring arm 84 (FIGS. 2 and 7) which is stamped and formed out of side plate 30b of the metal shell, is effective to bias pin member 64 into the heart-shaped cam slot 70 of cam slider 62. FIG. 5 shows the rear end of memory card 36 in three positions, namely: the "overrun" position at 36c, the continual contact-making position at 36d and the tentative locking position at 36e where the locking projection of the cam slider snaps into the locking recess of the memory card.

Figure 19:
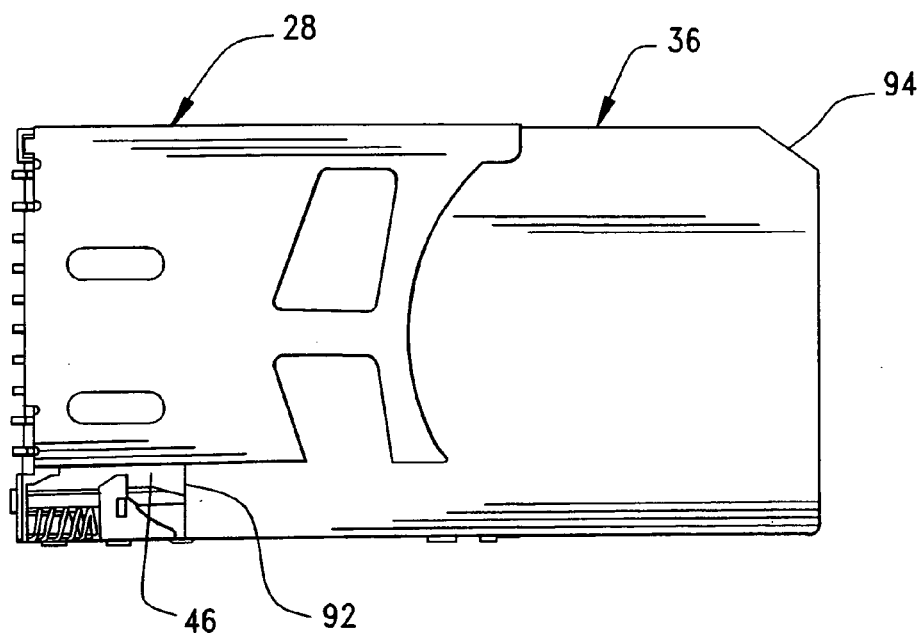
FIG. 19 is a top plan view of the connector, with the top plate of the metal shell cut-away to show the interior means for preventing a wrongly oriented memory card from being fully inserted into the connector.

FIG. 19 shows how an erroneously oriented memory card is prevented from being completely inserted into the connector when a rear end 92 of the memory card is inserted first into the cavity. Since the rear end of the memory card does not have a rounded or recessed corner 94, the rear end will abut against card stop flange 46 which prevents the rear end from engaging and damaging the contact portions of the terminals. The same stopping action will occur if an attempt is made to insert the memory card in an erroneous upside-down orientation.

Figure 20:
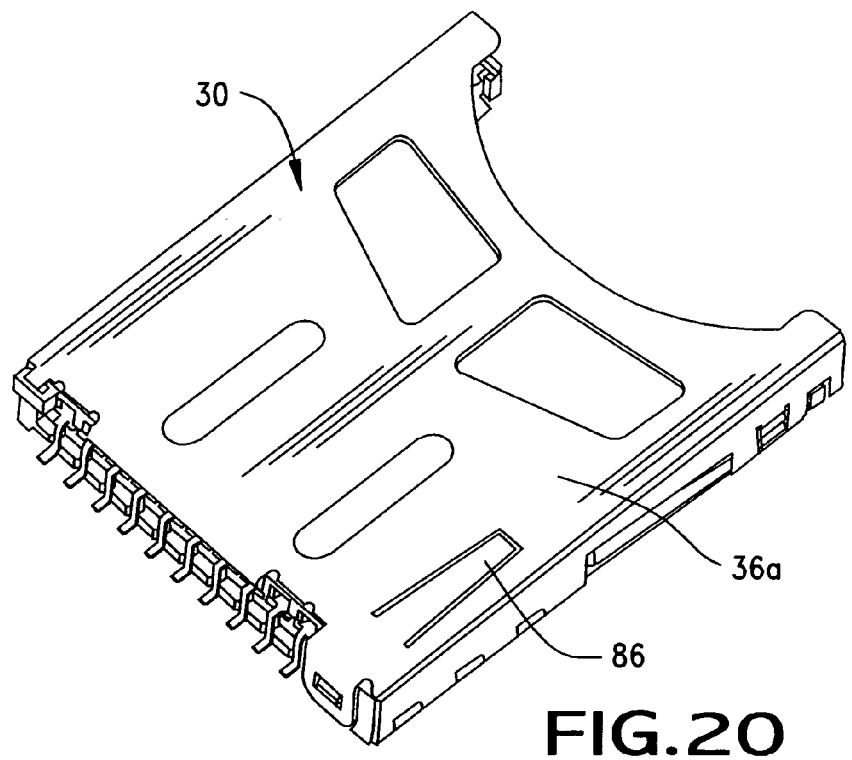
FIG. 20 is a view similar to that of FIG. 2, but showing a second version of the spring member in the top plate of the metal shell.

FIG. 20 shows an alternative version of spring arm 86 stamped and formed out of top plate 30a of metal shell 30. In comparing FIG. 20 with FIGS. 2 and 5, spring arm 86 in FIG. 20 is of a cantilevered-type versus the suspension-type spring arm of the first version in FIGS. 2 and 5. Regardless, the cantilevered spring arm 86 of FIG. 20 similarly functions to swing cam slider 62 and bias locking projection 68 upwardly toward locking recess 36b (FIG. 16) in memory card 36.

Figure 21:
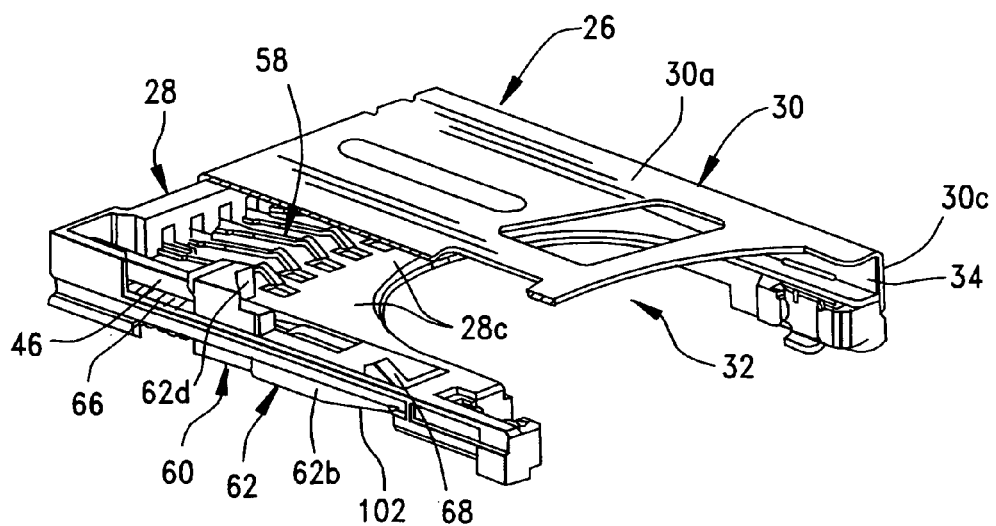
FIG. 21 is a top perspective view of a second embodiment of the invention, with the metal shell partially cut-away.
Figure 22:
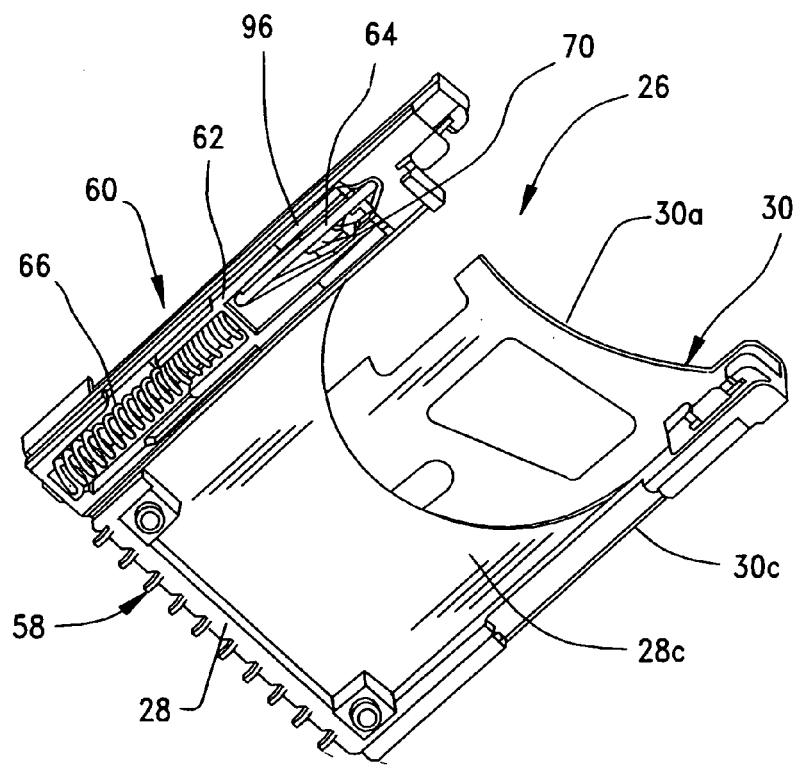
FIG. 22 is a bottom perspective view of the embodiment of FIG. 21.

FIGS. 21-25 show a second embodiment of the invention which functions quite similar to the first embodiment, except that the heart-shaped cam slot 70 of cam slider 62 is formed in a bottom surface 96 of the slider as can be seen in FIG. 22. Correspondingly, pin member 64 of card ejector mechanism 60 also is located at the bottom of the connector. Otherwise, the card ejector mechanism operates the same as described above in relation to the first embodiment, and like reference numerals have been applied in FIGS. 21-25.

Figure 23:
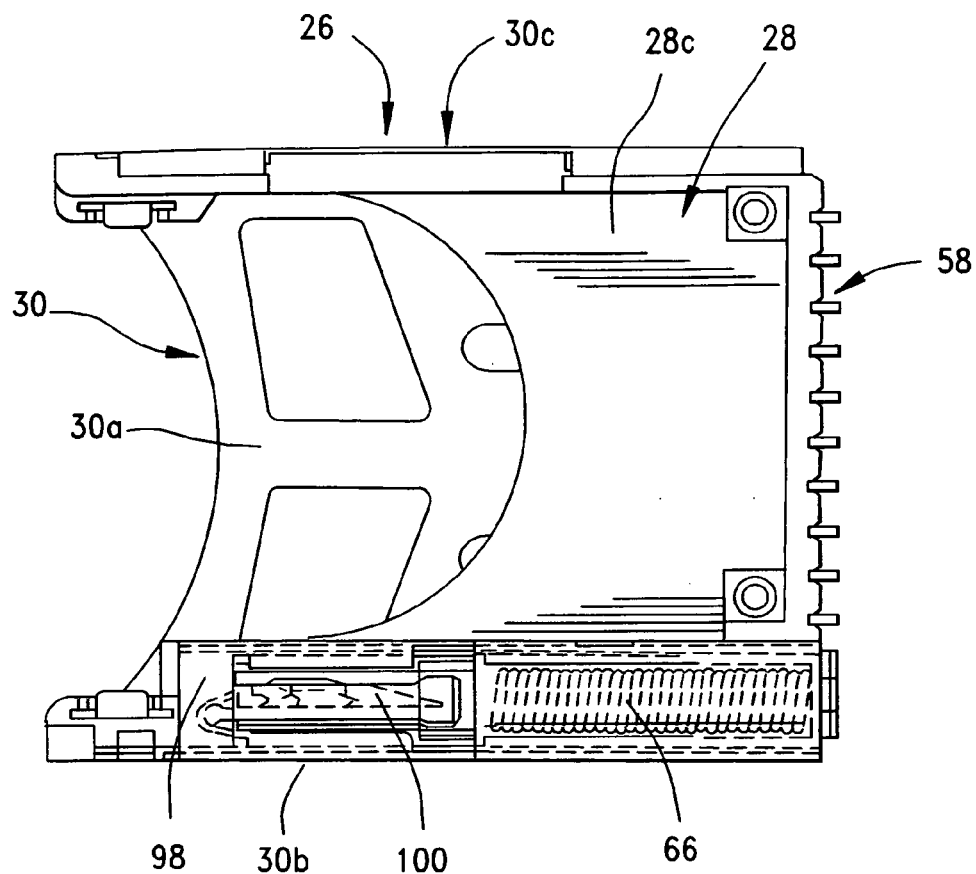
FIG. 23 is a bottom plan view of the embodiment of FIG. 21.
Figure 24:
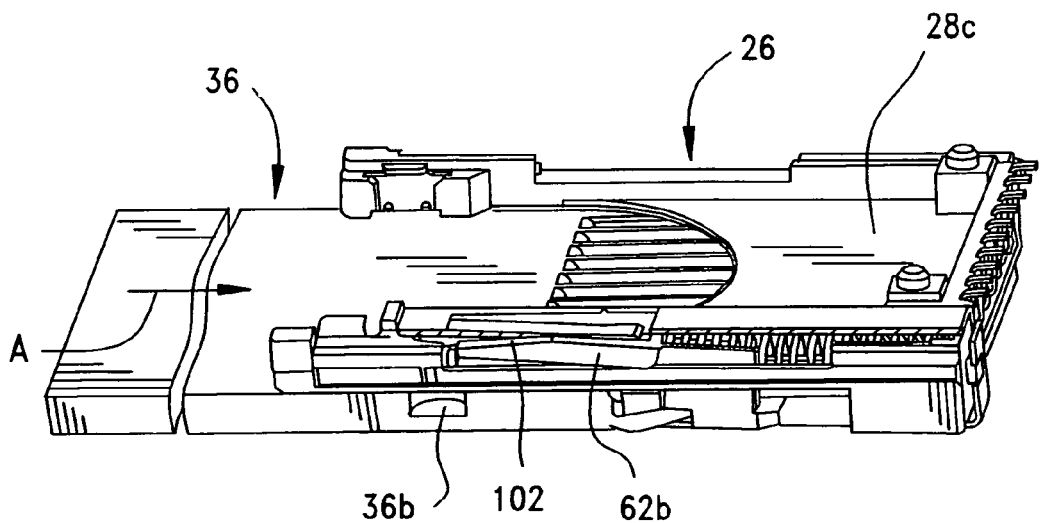
FIGS. 24 and 25 are sequential views of insertion of a memory card into the connector according to the second embodiment of FIG. 21.
Figure 25:
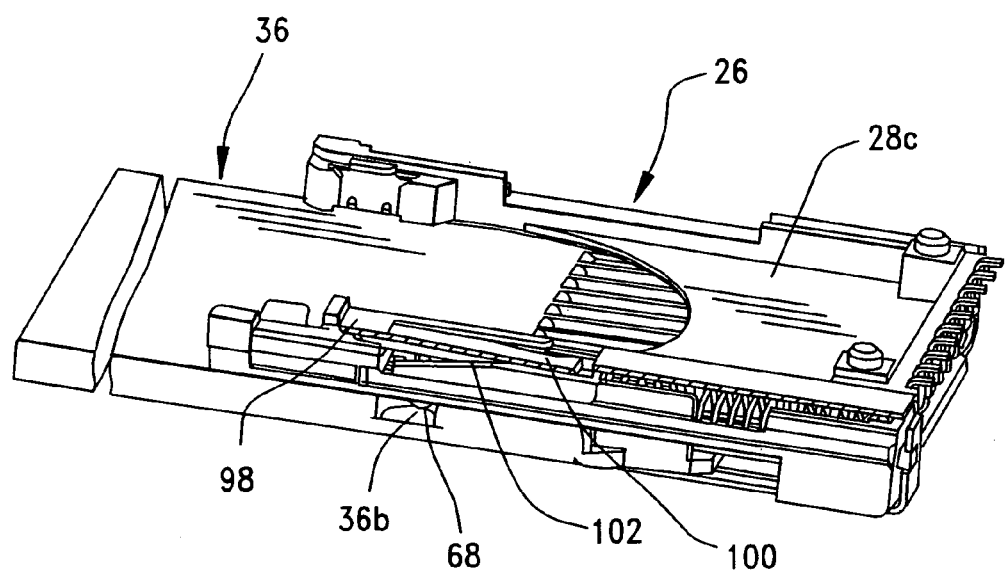

In order to accommodate the bottom location of the cam slot and pin member as seen in FIG. 22, FIG. 23 shows that side plate 30b of the metal shell has a bottom, inwardly turned flange 98 from which a rearwardly projecting spring arm 100 extends for engaging and biasing the pin member into the cam slot. Otherwise, the card ejector mechanism functions the same as described above in relation to the first embodiment of FIGS. 1-20. In particular, it can be seen that locking projection 68 still projects upwardly as seen in FIG. 21, and card-engaging surface 62d of cam slider 62 is exposed in the card-receiving cavity for engagement by the memory card. When the memory card is inserted into the connector in the direction of arrow "A" (FIG. 24), locking projection 68 will snap into locking engagement with locking recess 36b at the edge of the memory card as seen in FIG. 25, and the operation of the card ejector mechanism will function the same as described above in relation to the first embodiment of FIGS. 1-20. Finally, in order to accommodate swinging movement of locking arm 62b, the swinging distal end of the locking arm is recessed, as at 102, to allow for downward movement of the locking arm without abutting the printed circuit board.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A memory card connector, comprising:
   an insulative housing having a rear terminal-mounting section which mounts a plurality of terminals having contact portions for engaging appropriate contacts on a memory card;
   a metal shell mounted on the housing and combining therewith to define an interior card-receiving cavity formed by a top plate and opposite side plates of the metal shell, the cavity having a front insertion opening to permit insertion and withdrawal of the memory card into and out of the connector, with said terminal-mounting section of the housing being located at the rear of the cavity; and
   a card ejector mechanism at least partially beneath the cavity adjacent one side thereof, whereby the opposite side plates of the metal shell define the opposite sides of the cavity; said card-ejector mechanism including a card-engaging slider movable with the card and having a cam slot in a bottom face thereof, and one of the side plates of the metal shell has a bottom inwardly turned flange with a spring member for biasing a cam follower pin into the cam slot.

2. The memory card connector of claim 1 wherein said metal shell is stamped and formed of sheet metal material, and said spring member comprises a spring arm stamped from said inwardly turned flange out of the one side plate of the metal shell.

3. The memory card connector of claim 1 wherein said card ejector mechanism includes a card-engaging slider movable with the card and having a cam slot in an outside face thereof, and one of the side plates of the metal shell includes a spring member for biasing a cam follower pin into the cam slot.

4. The memory card connector of claim 3 wherein said metal shell is stamped and formed of sheet metal material, and said spring member comprises a spring arm stamped out of the one side plate of the metal shell.

5. A memory card connector, comprising:
   an insulative housing having a rear terminal-mounting section which mounts a plurality of terminals having contact portions for engaging appropriate contacts on a memory card;
   a metal shell mounted on the housing and combining therewith to define an interior card-receiving cavity formed by a top plate and opposite side plates of the metal shell, the cavity having a front insertion opening to permit insertion and withdrawal of the memory card into and out of the connector, with said terminal-mounting section of the housing being located at the rear of the cavity; and
   a card ejector mechanism at least partially beneath the cavity adjacent one side thereof, whereby the opposite side plates of the metal shell define the opposite sides of the cavity and wherein said card ejector mechanism includes a slider having a locking arm that swings up and down into and out of engagement with a locking recess in the overlying memory card.

6. The memory card connector of claim 5 wherein said housing includes a cut-out area beneath the locking arm to accommodate downward swinging movement of the arm.

7. The memory card connector of claim 5 wherein said locking arm is a cantilevered member that is recessed along a distal end thereof to allow for downward swinging movement of the locking arm.

8. The memory card connector of claim 5 wherein said metal shell includes a spring member for engaging a portion of the slider to bias the locking arm into engagement with the recess in the overlying memory card.

9. The memory card connector of claim 8 wherein said metal shell is stamped and formed of sheet metal material, and said spring member comprises a spring arm stamped out of the top plate of the metal shell.

10. A memory card connector, comprising:
    an insulative housing having a rear terminal-mounting section which mounts a plurality of terminals having contact portions for engaging appropriate contacts on a memory card;
    a metal shell mounted on the housing and combining therewith to define an interior card-receiving cavity formed by a top plate and opposite side plates of the metal shell, the cavity having a front insertion opening to permit insertion and withdrawal of the memory card into and out of the connector, with said terminal-mounting section of the housing being located at the rear of the cavity;
    a card ejector mechanism at least partially beneath the cavity adjacent one side thereof whereby the opposite side plates of the metal shell define the opposite sides of the cavity, the card ejector mechanism including a card-engaging slider movable with the card and having a cam slot in one face thereof, the slider having a locking arm that swings up and down into and out of engagement with a locking recess in the overlying member card; and
    said metal shell including a first spring member for biasing a cam follower pin into the cam slot and a second spring member for engaging a portion of the slider to bias the locking arm into engagement with the recess in the overlying memory card.

11. The memory card connector of claim 10 wherein the cam slot of said slider is in an outside face thereof, said metal shell is stamped and formed of sheet metal material, and said first spring member comprises a spring arm stamped out of one side plate of the metal shell.

12. The memory card connector of claim 10 wherein the cam slot of said slider is in a bottom face thereof, one side plate of the metal shell has a bottom inwardly turned flange, and said first spring member comprises a spring arm stamped from the flange.

13. The memory card connector of claim 10 wherein said metal shell is stamped and formed of sheet metal material, and said second spring member comprises a spring arm stamped out of the top plate of the metal shell.

14. The memory card connector of claim 10 wherein said housing includes a cut-out area beneath the locking arm to accommodate downward swinging movement of the arm.

15. The memory card connector of claim 10 wherein said locking arm is a cantilevered member that is recessed along a distal end thereof to allow for downward swinging movement of the locking arm.

* * * * *